United States Patent [19]

Evers

[11] Patent Number: 4,766,301

[45] Date of Patent: Aug. 23, 1988

[54] TEXTILE FABRIC WITH WOVEN-IN BAR CODE

[75] Inventor: Hubertus N. C. Evers, Heeze, Netherlands

[73] Assignee: Robert A. Van der Laan, Cierlingsbeek, Netherlands

[21] Appl. No.: 893,504

[22] Filed: Aug. 5, 1986

[30] Foreign Application Priority Data

Aug. 20, 1985 [NL] Netherlands .......................... 8502290

[51] Int. Cl.$^4$ .............................................. G06K 19/00
[52] U.S. Cl. ...................................... 235/487; 235/462; 235/494
[58] Field of Search ......................... 235/487, 462, 494

[56] References Cited

U.S. PATENT DOCUMENTS 4,415,802 1/1983 Long ..................................... 235/375

FOREIGN PATENT DOCUMENTS

| 0076405 | 4/1983 | European Pat. Off. . |
| 478699 | 1/1938 | United Kingdom . |
| 748476 | 5/1956 | United Kingdom . |
| 865736 | 4/1961 | United Kingdom . |
| 1261465 | 1/1972 | United Kingdom . |
| 1380161 | 1/1975 | United Kingdom . |
| 1549628 | 8/1979 | United Kingdom . |
| 2140181 | 11/1984 | United Kingdom . |
| 2164670 | 3/1986 | United Kingdom . |

*Primary Examiner*—Harold I. Pitts
*Attorney, Agent, or Firm*—Pennie & Edmonds

[57] ABSTRACT

A textile fabric composed of natural and/or synthetic fibers and provided with a bar code. Labels consisting of such a textile fabric can be applied or attached to objects. A process for the manufacture of such fabric and labels is also described.

12 Claims, 1 Drawing Sheet

TEXTILE FABRIC WITH WOVEN-IN BAR CODE

BACKGROUND

Recently, it has become customary to provide a wide variety of objects, in particular those objects which are sold over the counter, with a so-called bar code whereby the memory of a computer which may hold all sorts of data, for instance stock, composition, price and so forth, can be influenced. This bar code can be read by a light beam emitted by, for instance, a laser or an infrared source.

In many cases the bar code can be applied by printing onto the object itself. In those instances where this mode of application is impracticable or undesirable, it is common practice to employ labels which are somehow attached to or onto the object. Such labels sometimes consist of a printed paper base, but in other cases, especially when textile goods have to be coded, the label also consists of a fabric. Until now, such fabric has invariably been coded by printing and the label is fixed to the object to be marked by sewing on or sticking on. The use of a printing technique is attended with a serious disadvantage, especially when it serves the purpose of marking textile goods, in that the code is no longer clearly legible in the course of time. This holds true in particular for textile goods inasmuch as these often have to be washed before as well as after being sold. It is an object of the invention to obviate this disadvantage and accomplich still other advantages.

SUMMARY OF THE INVENTION

The present invention relates to a fabric composed of natural and/or synthetic fibers and labels made therefrom and is characterized by the fact that a bar code has been woven into the fabric.

The code bars must obviously consist of material which contrasts with the base, at least as seen by the scanning beam.

As it is particularly difficult to weave a bar code directly into a limited section of a more extensive length of fabric from which, say, garments, towels, curtains and the like are later to be made, and where each individual section requires its own bar code, the invention relates in particular to labels provided with a woven-in bar code. These labels are intended to be applied to textile goods or attached to another object. The term "object" must here be understood to denote any arbitrary object like, for instance, a machine part, a toy, a bottle and so forth. In this particular context, however, object is meant to stand for a textile product, whether or not in a finished state. The label may be fixed to or onto the object in an arbitrary fashion; for objects consisting of textile material, it will be general practice to use a label which can be attached by sewing on or sticking on.

In the case of labels provided with an adhesive coat, it is possible to employ a material whose adhesion is derived from a heat treatment. Such materials are known per se. It has been found particularly advantageous, however, especially for the labeling of textile fabrics, to use an adhesive coat containing polyamides, because these readily bond to the objects to be labeled upon a light heat treatment, for instance by means of a smoothing iron.

DESCRIPTION OF THE PREFERRED EMBODIMENT

Figure 1:
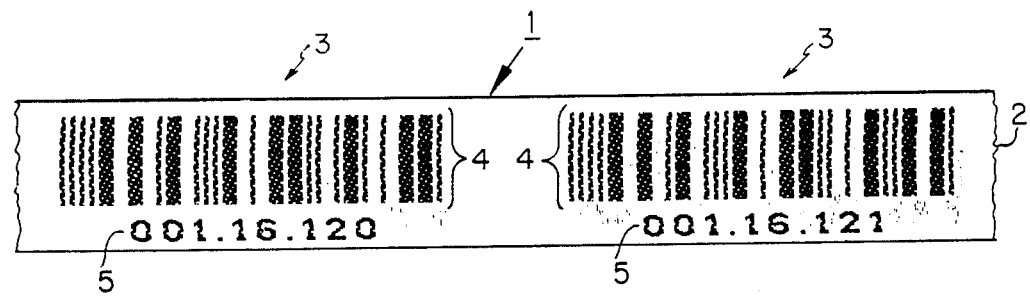
FIG. 1 is a plan view of a fabric containing labels constructed in accordance with the teachings of the present invention.

As shown in FIG. 1, the fabric 1 is made as a band 2 of material, having a plurality of labels 3 each of which comprises a bar code 4 woven therein. In the embodiment of the present invention, not only the bar code but also visually legible characters like letters or figures are woven in.

Figure 2:
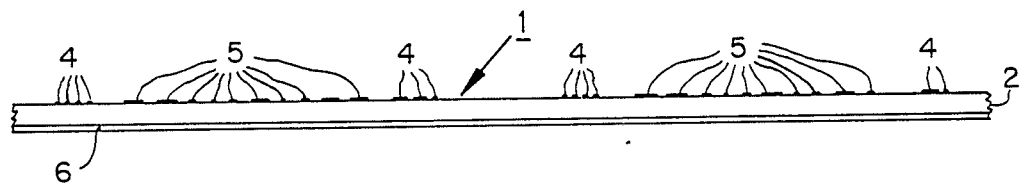
FIG. 2 is a side view of the structure shown in FIG. 1.

Labels according to the present invention may be woven singly, but it is especially advantageous to produce a continuous series of identical labels, for instance on a band weaving maching. Two such labels 3 are shown in FIG. 1 on a band 2 of fabric. According to an advantageous embodiment of the invention, in particular when the band weaving machine is computer-operated, the bar code is woven in such that a serial number can also be read from the code of each label. As shown in the drawings, labels of this type have a code section 4 that is identical for all of them and a code section 5 specific to each individual label (serial number code). Such an embodiment is of interest, for instance for companies hiring out garments, towels, and the like. In addition, this serial number coding may be used by a manufacturer for checking and administering the distribution of identical products, which therefore are given the same general code section. As shown in FIG. 2, an adhesive coat 6 is applied to the bottom side of the fabric 2. The adhesive coat preferably contains a polymide so as to be activated by suitable heat treatment for attaching the label to the desired object.

A variant of this serial number coding consists in that a series of consecutively woven labels are provided with the same code serial number and the next or subsequent series with another code serial number.

The band 2 of labels 3 issuing from the band weaving machine (whether or not with code serial numbers woven in) may be sold by the roll. Alternatively, the band may already have been cut up by the manufacturer into separate labels and packed in boxes. If the labels bear a code serial number, they are preferably put in boxes in their proper order.

According to an altogether different process, the labels of the invention may be manufactured from a textile fabric of far larger size than one label and in which the bar code has been incorporated. From this considerably larger piece of textile the labels may be severed, for instance, by cutting, either singly or in the form of a band. Naturally, this larger piece of textile must have a repetitive pattern of the bar code woven in.

As mentioned hereinbefore, a textile fabric, especially a label, according to the invention has the great advantage of durability on the understanding that the materials for both the fabric fibers and the dyestuffs have been suitably chosen, even when the fabric or label has been applied to a textile which must frequently be subjected to laundering with the customary detergents.

What is claimed is:

1. A textile fabric composed of natural and/or synthetic fibers, characterized in that a bar code has been woven into the fabric.

2. A label intended to be applied to or attached to an object, characterized in that it consists of a textile fabric according to claim 1.

3. A label according to claim 2, characterized in that it is provided with an adhesive coat on one side.

4. A label according to claim 3, characterized in that the adhesive coat consists of a material which derives its adhesion from a heat treatment.

5. A label according to claim 4, characterized in that the adhesive coat contains a polyamide.

6. A label according to any one of claims 2-5, characterized in that not only the bar code but also visually legible characters like letters orfigures have been woven in.

7. A band consisting of a continuous series of labels according to any one of claims 2-5.

8. A band according to claim 7, characterized in that the labels have been provided with a woven-in serial number code.

9. A process for the manufacture of a band according to claim 7, characterized in that the band is produced on a computer-operated band weaving machine.

10. A process for the manufacture of labels according to any one of claims 2-5, characterized in that such labels and band are made by cutting up a textile fabric according to claim 1 which incorporates a repetitive pattern of a label or band.

11. A textile fabric provided with a label according to any of claims 2-5 affixed by sewing on or sticking on.

12. A process for the manufacture of labels according to claim 7 characterized in that such labels and band are made by cutting up a textile fabric composed of natural and/or synthetic fibers that has a bar code woven into the fabric which incorporates a repetitive pattern of label or band.

* * * * *

UNITED STATES PATENT AND TRADEMARK OFFICE
CERTIFICATE OF CORRECTION

PATENT NO. : 4,766,301

DATED : Aug. 23, 1988

INVENTOR(S) : Hubertus N.C. Evers

It is certified that error appears in the above-identified patent and that said Letters Patent is hereby corrected as shown below:

```
On the title page   at [73] Assignee:  line 2

"Cierlingsbeek" should read --Vierlingsbeek--
```

Signed and Sealed this

Ninth Day of May, 1989

Attest:

DONALD J. QUIGG

Attesting Officer

Commissioner of Patents and Trademarks